United States Patent [19]
Benjamin et al.

[11] 3,796,289
[45] Mar. 12, 1974

[54] CENTRIFUGAL BRAKING DEVICE

[75] Inventors: John W. Benjamin; Edward Thorne Holland, both of Lancaster, Pa.

[73] Assignee: Control Flow Systems, Inc., Lancaster, Pa.

[22] Filed: Feb. 1, 1971

[21] Appl. No.: 111,718

Related U.S. Application Data

[63] Continuation of Ser. No. 800,513, Feb. 19, 1969, abandoned.

[52] U.S. Cl. .................. 188/185, 193/32, 193/37
[51] Int. Cl. .................................. F16d 51/12
[58] Field of Search ......... 188/185, 180; 193/32, 37

[56] References Cited
UNITED STATES PATENTS

| | | | |
|---|---|---|---|
| 3,209,880 | 10/1965 | Dietiker | 193/32 X |
| 3,340,977 | 9/1967 | Cowan | 193/37 |
| 3,349,876 | 10/1967 | Sheckells | 188/185 |
| 3,209,880 | 10/1965 | Dietiker | 193/32 X |
| 3,340,977 | 9/1967 | Cowan | 193/37 |
| 3,349,876 | 10/1967 | Sheckells | 188/185 |

FOREIGN PATENTS OR APPLICATIONS

| | | | |
|---|---|---|---|
| 1,105,933 | 3/1968 | Great Britain | 188/185 |
| 1,105,933 | 3/1968 | Great Britain | 188/185 |

*Primary Examiner*—George E. A. Halvosa
*Attorney, Agent, or Firm*—James C. Nemmer; Haven E. Simmons

[57] ABSTRACT

A braking device for use in retarding and limiting the speed of an object gravitationally moving along a conveyor. The braking device is connected to a rotatable wheel which engages the moving object. The wheel is operatively conneced to a centrifugal device through a gear train, and as the speed of the wheel increases, the braking force of the centrifugal device increases to limit the speed of the wheel and thus retard further acceleration of the moving object in engagement with the wheel.

10 Claims, 4 Drawing Figures

PATENTED MAR 12 1974 3,796,289
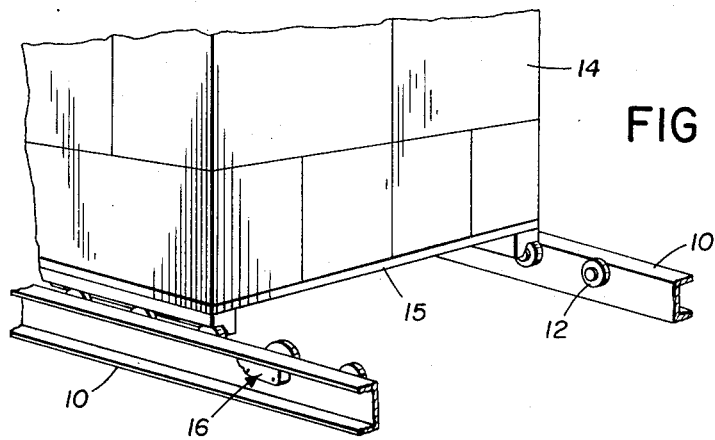
FIG 1
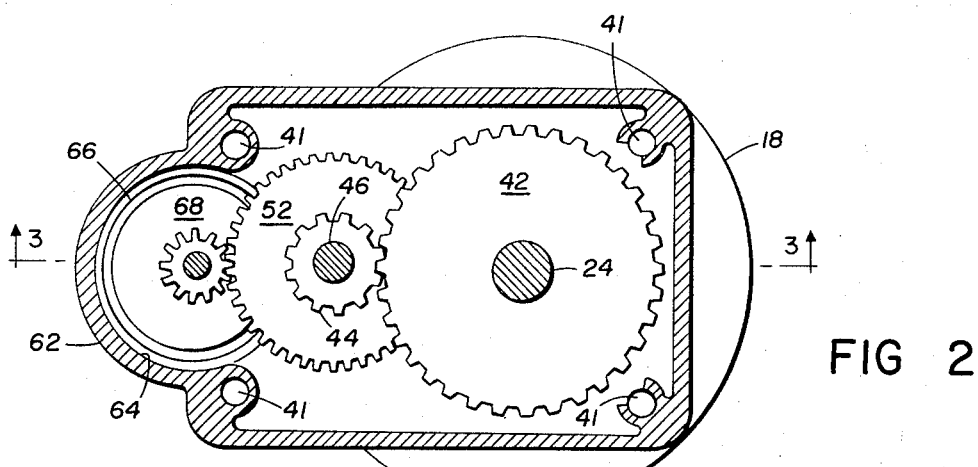
FIG 2
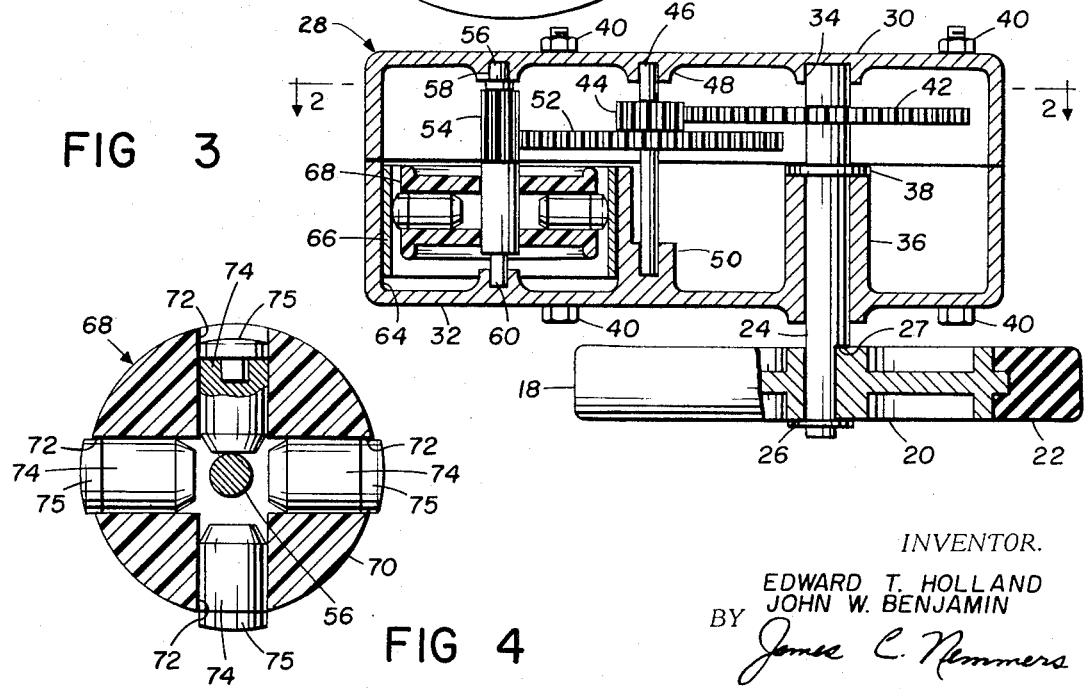
FIG 3
FIG 4
INVENTOR.
EDWARD T. HOLLAND
JOHN W. BENJAMIN
BY James C. Nemmers
ATTORNEY

3,796,289

CENTRIFUGAL BRAKING DEVICE

This is a continuation of U.S. Pat. application Ser. No. 800,513, filed Feb. 19, 1969, now abandoned.

BACKGROUND OF THE INVENTION

In materials handling systems where loads are moved and stored on pallets, or where unit loads are moved along conveyors, it is desirable that the loads be moved from place to place, stored and removed in the most efficient and least expensive fashion. Obviously, systems in which movement of a load is accomplished and controlled by power conveyors are the most expensive to install, maintain and operate. On the other hand, the simpler gravity systems are the least expensive to purchase and operate. In gravity conveyor systems, however, particularly where large or heavy loads are being handled, the speed and braking of the load obviously must be controlled in some manner or acceleration of a load to a high velocity can present braking problems and ultimately can cause damage to the load and to the conveyor system itself. The gravity conveyor systems commonly used consist of roller or wheel conveyors combined with a braking arrangement to limit the speed of the loads being conveyed. A number of prior art braking arrangements have speed-governing devices built into rollers themselves. Obviously, this type of an arrangement cannot be used in a wheel conveyor and, moreover, space restrictions within a roller limit the effectiveness of the braking action as well as make the braking device expensive. It is also known in the prior art to provide a braking device between the spaced rollers on wheels, such devices being located at intervals necessary to provide the desired braking action. However, the prior art devices of this type are somewhat expensive and have not been too satisfactory from a performance standpoint. Moreover, many of the prior art devices are such that the friction inherent in the necessary gearing arrangement itself imposes too great a load on the moving object and retards movement of the object more than is desirable. To avoid this, these braking devices are sometimes spaced apart a considerable distance, but the separation permits acceleration of the object between the times it engages the successive braking devices and thereby causing an impact between the moving object and each braking device which can damage the braking device or limit its useful life. Moreover, none of the prior art braking devices are capable of handling loads which vary in weight unless the device is modified or manually adjusted.

SUMMARY OF THE INVENTION

Applicants' invention provides a very simple, inexpensive but effective centrifugal brake arrangement which can be used in connection with almost any type of gravity conveyor. Through a simple gear train, a rotor is driven at a relatively high speed, the rotor containing radially oriented pins which are moved into engagement with the braking surface by the centrifugal force of the rotating rotor. The device of the invention requires very few parts and yet is extremely effective. The amount of the braking force can be varied by the size and number of the braking pins utilized. The design of the device is such that at very low speeds there is virtually no resistance to pallet movement thus assuring proper pallet movement at all times. However, as the speed of the load increases, the braking device attains maximum effectiveness and prevents further pallet acceleration. Thus, gentle load flow with no load-disturbing action is assured. The device of the invention has many and varied applications in the materials handling field, and the basic design can also be used in any application where a braking device of this type is required. The above features and advantages of the invention as well as others will be evident to those skilled in the art from a consideration of the description of the preferred embodiment herein.

BRIEF DESCRIPTION OF THE DRAWINGS

FIG. 1 is a perspective view of a portion of a pallet conveyor showing the braking device of the invention in position to engage a loaded pallet moving on the conveyor;

FIG. 2 is a side elevational view partly in section taken on the line 2—2 of FIG. 3 and showing the gear train for the braking device;

FIG. 3 is a sectional view taken on the line 3—3 of FIG. 2; and

FIG. 4 is a sectional view of only the brake rotor.

DESCRIPTION OF THE PREFERRED EMBODIMENT

In FIG. 1 there is shown a portion of one type gravity conveyor with which the invention can be used. All of the details of the conveyor are not shown since these details are obvious to those skilled in the art, but the portion of the roller-type conveyor shown consists of parallel side rails 10 to the inside of which there are rotatably attached a plurality of conveyor wheels or rollers 12. The wheels 12 are customarily located at equally spaced intervals, and the outer periphery of each wheel extends above the top surface of the rails 10 so as to be engageable by the load 14 to be conveyed. Generally, the load 14 is carried on a pallet 15 of any suitable type.

The type of conveyor which has been briefly described is of the gravity type and is commonly used for storage purposes. When so used, the loads are placed on the conveyor at their higher end and are advanced by gravity toward the lower end. Usually, after a period of storage, the loads are generally removed from the conveyor at the lower end on a first-in, first-out basis. As each load is removed, obviously the load next in line gravitates toward the end in position to be removed when desired. Normally, these gravity storage conveyors are of considerable length and it will be appreciated that if uncontrolled, the loads can accelerate to a runaway speed which can be dangerous and cause damage. To control the speed of the loads, the entire conveyor can be powered, but this is quite expensive particularly where the conveyors are used for storage and, therefore, operated only intermittently. Therefore, a speed control device, indicated generally by the reference numeral 16 is provided at spaced intervals along one of the side rails 10 of the gravity conveyor. The devices 16 preferably are spaced along the side rail 10 at intervals so that one such device is in engagement with a moving load at all times, thereby providing continuous and positive control of the speed of a load.

Referring now to FIGS. 2, 3, and 4, the details of the novel speed control device are shown. Each of the devices 16 has a drive wheel 18 which extends above the top surface of the side rails 10 a sufficient amount so as to be engageable with the lower surface of the pallet 15 carrying the load 14. Preferably, the drive wheel 18 consists of a hub 20 upon which there is mounted a tire 22 of suitable resilient material. This construction is preferred so that the outer periphery of the wheel 18 can extend slightly above the level of wheels 12 thereby assuring engagement of the drive wheel 18 with the pallet 15 regardless of irregularities in the latter. The use of the resilient tire 22 as a part of the drive wheel 18 also absorbs the shock of engagement of the load with the wheel 18. Of course, the use of a resilient, high-friction material for the tire 22 will further assure rotation of the drive wheel 18 even though the underside of the pallet 15 may have a low-friction surface. The hub 20 of the drive wheel 18 is suitably affixed to a shaft 24 so as to be turnable therewith. As shown in FIG. 3, the outer end of the shaft 24 has a segment thereof removed and the opening in the hub 20 has a corresponding flat portion. The hub 20 is restrained from outward axial movement along shaft 24 by a removable snap ring 26, and is restrained from axial movement inwardly by the inside of the hub 20 which engages the shoulder 27 formed on the shaft 24 by removal of the segmental portion.

The shaft 24 is freely turnable within a housing indicated generally by the reference numeral 28. The housing is formed in two halves, the cover half 30 and the brake half 32. Preferably, the housing halves 30 and 32 are held in assembled position by suitable fastening means, such as bolts 40, one such bolt 40 extending through an opening 41 at each corner of the housing 28. The cover half 30 has a boss 34 formed therein near one end thereof that provides a bearing for the end of drive shaft 24. The brake half 32 of housing 28 has a corresponding boss 36 formed therein, which boss 36 extends inwardly substantially the full depth of the brake half 32. A snap ring 38 is affixed to shaft 24 near the end of boss 36 so as to prevent removal of shaft 24 from the housing 28 unless the snap ring 38 is first removed.

Secured to the inner end of the drive shaft 24 is a main drive gear 42. The gear 42 is affixed to the shaft 24 in any suitable manner and can be permanently affixed thereto since if the wheel 18 is removed, it is not necessary to remove the gear 42 in order to disassemble the device 16. The gear 42 thus rotates at the same speed as the drive wheel 18.

The main drive gear 42 is engageable with a secondary pinion gear 44 which is affixed to a shaft 46 positioned parallel to drive shaft 24 and freely rotatable in bosses 48 and 50 in housing halves 30 and 32 respectively, which bosses serve as bearings for the shaft 46. Also affixed to and turnable with shaft 46 adjacent to secondary pinion 44 is a secondary gear 52 which in turn is engageable with a rotor pinion 54 affixed to a shaft 56. Shaft 56 is positioned parallel to shafts 46 and 24 and is rotatable in bosses 58 and 60 formed in housing halves 30 and 32 respectively, which bosses serve as bearings for shaft 56.

The various gears and pinions in the gear train which has been described contain the number of teeth which will produce the desired speed ratio between the drive shaft 24 and the rotor shaft 56. In the embodiment shown, there is approximately a 60–1 ratio between the speeds of the main drive shaft 24 and the rotor shaft 56.

As best seen in FIG. 2, the end 62 of housing 28 which contains the rotor shaft 56 is smaller than the remaining portion of the housing and is circular shaped. Inside the brake half 32 of housing 28 this portion 62 of the housing 28 is shaped to provide a brake drum 64 in the form of a continuous circular surface. The inside surface of brake drum 64 can, if desired, be provided with the liner 66 formed of a suitable material that will give the desired braking qualities together with wearing qualities. We prefer to form the housing 28 of a suitable moldable plastic material and to form the liner 66 of metal.

Rotatable within the brake drum 64 and affixed to the rotor shaft 56 is a rotor assembly indicated generally by the reference numeral 68. The rotor assembly consists of a rotor 70 preferably molded of a suitable material. The rotor 70 contains a plurality of radial passageways 72 which in the preferred embodiment are cylindrical-shaped. Each passageway 72 extends to the outer periphery of the rotor 70, and received in each of the passageways 72 is a rotor pin 74. If desired, each pin 74 can be provided at its outer end with a tip 75 of a suitable material such as polyurethane, which will minimize noise during operation and will increase the braking effect without disturbing the freedom of the unit under static conditions. This construction provides a relatively quiet, shock-free braking arrangement. The number of passageways 72 and brake pins 74 is determined by the braking effect desired. Of course, the location of the pins 74 should be such so that the rotor assembly 68 is balanced. The rotor pins 74 are freely movable within the passageway 72 and are slightly shorter in length than the passageways. Thus, when the rotor assembly 68 is at rest, the pins will not be in engagement with the brake drum 64 except as a pin may be affected by gravity. However, when the rotor assembly is rotated, the centrifugal force produced by the rotation will force the pins 74 outwardly against the brake drum 64, and the friction forces thus produced will resist rotation of the rotor shaft 56. This resistance will be multiplied through the gear train back to the drive wheel 18 which will in turn resist movement of any load that is engaged therewith. At very low speeds, there is virtually no resistance to load movement since the centrifugal force exerted on brake pins 74 will be minimal. However, as the linear velocity of a load increases thereby rotating drive wheel 18 faster, the braking effect will reach its maximum and prevent further acceleration of the load. The design of the device is such that movement of the loads will be consistent and gentle and no load disturbing action will result. Since the force resisting load movement is infinitely variable in relationship to speed of the load, loads of a widely varying weight can travel over the same system with no adjustment required in the speed control device 16. This is not true of prior art devices which require adjustment for varying loads or they will provide too much resistance to light loads at low speeds and not enough to heavy loads at high speeds.

The operation of the speed control device of the invention thus provides a variable braking action on loads traveling on a conveyor. For this purpose, it is common to provide one braking device for each load interval. Normally, pallets are used to carry loads and the pallets are of a known length. These braking devices will thus be spaced along the conveyor so that a pallet is always in engagement with one of the braking devices. The device of the invention is extremely simple and thus can be added to a gravity system at a reasonably low cost. The arrangement is obviously much simpler and less expensive than a full powered conveying system but provides effective control of a wide range of loads. The device is designed to be substantially trouble-free and maintenance-free and to give long life. Obviously, the device can be applied to varying kinds of gravity conveying means whether the conveyors have rollers, wheels or other friction reducing means. The principles of the invention can also be applied to any situation where a variable braking action is desired to govern speed.

Having thus described the invention, it will be obvious to those skilled in the art that various revisions and modifications can be made to the preferred embodiment disclosed herein without departing from the spirit and scope of the invention. It is our intention, however, that all such revisions and modifications which are obvious to those skilled in the art will be included within the scope of the following claims:

We claim:

1. A braking device for use in retarding and limiting the speed of an object moving by gravity along a conveyor, said device comprising a rotatable member engageable with said object when said device is used in connection with said conveyor, said member being rotated as said object engages it and moves along the conveyor, an annular braking surface, rotatable friction means located centrally of said braking surface and operatively connected to said rotatable member, the axis of said rotatable member being fixed relative to the axis of said rotatable friction means, and means interconnecting said rotatable member and said friction means so that said friction means rotates at a considerably higher speed than said rotatable member, said friction means including a rotor having a plurality of radial passageways and a plurality of braking pins, one of said pins being freely movable in each of said passageways to engage said braking surface when forced radially outwardly.

2. The braking device of claim 1 in which said pins are equally spaced within said rotor.

3. The braking device of claim 1 in which each of said pins has affixed to its outer tip a friction material having a higher coefficient of friction than said braking surface.

4. The braking device of claim 1 in which the components of said device except for said rotatable member are enclosed within a housing, and a portion of the inner surface of said housing provides said braking surface.

5. The braking device of claim 4 in which said means interconnecting the rotatable member and friction means is a gear train, and each of said gears is affixed to and rotatable with a shaft, said housing providing the bearings for said shafts.

6. A braking device for use in retarding and limiting the speed of an object moving by gravity along a conveyor, said device comprising a housing, a first shaft rotatably mounted within said housing, about a fixed axis and having one end extending outside said housing, a rotatable member secured to the outer end of said shaft and rotatable therewith, a first spur gear affixed to said shaft within said housing, a second shaft rotatably mounted within said housing about an axis parallel to said first shaft, a small pinion affixed to said second shaft and engageable with said first spur gear, a second spur gear affixed to said second shaft, a third shaft rotatably mounted within said housing about an axis parallel to the axes of said first and second shafts, a small pinion affixed to said third shaft and engageable with said second spur gear, a rotor affixed to and rotatable with said third shaft within said housing, an annular braking surface within said housing around the periphery of said rotor, said rotor having a plurality of radial passageways, and a plurality of braking pins, one in each of said passageways, each of said pins being freely moveable in its respective passageway so as to engage said braking surface when forced radially outwardly by centrifugal force as said rotor rotates.

7. The braking device of claim 6 in which said pins are equally spaced within said rotor.

8. The braking device of claim 6 in which each of said pins has affixed to its outer tip a friction material having a higher coefficient of friction than said braking surface.

9. The braking device of claim 6 in which a portion of the inner surface of said housing provides said braking surface.

10. The braking device of claim 9 in which the said housing provides bearings for said first, second and third shafts.

* * * * *